No. 884,702.

PATENTED APR. 14, 1908.

W. BOWDEN.
TIRE AND WHEEL THEREFOR.
APPLICATION FILED JULY 17, 1906.

WITNESSES:
Fred White
René Bruine

INVENTOR:
Walter Bowden,
By Attorneys.

UNITED STATES PATENT OFFICE.

WALTER BOWDEN, OF NEW YORK, N. Y.

TIRE AND WHEEL THEREFOR.

No. 884,702.

Specification of Letters Patent.

Patented April 14, 1908.

Application filed July 17, 1906. Serial No. 326,540.

*To all whom it may concern:*

Be it known that I, WALTER BOWDEN, a citizen of the United States, residing in the borough of Queens, county of Queens, city and State of New York, have invented a certain new and Improved Tire and Wheel Therefor, of which the following is a specification.

This invention relates to tires for vehicles, and aims to provide certain improvements therein.

According to my invention in its preferred form I provide a tire for vehicles, which may be either solid, cellular, or pneumatic, which may be rigidly held in place upon the wheel rim, and in which creeping is absolutely prevented.

In its preferred form my invention comprises a tire having a flange extending inwardly from its inner side, means being provided for clamping such flange to hold the tire in place upon the rim. Preferably such flange extends entirely around the inner side of the tire at about the middle thereof, and preferably the wheel is constructed with a two-part rim, each section of which is designed to laterally engage the flange, so that the latter is securely clamped between them. Preferably also I construct the wheel in two parts, each section being formed with a separable hub portion and a series of spokes connected with one section of the felly or rim.

My invention also includes other features of improvement which will be hereinafter more fully described.

Figure 1:
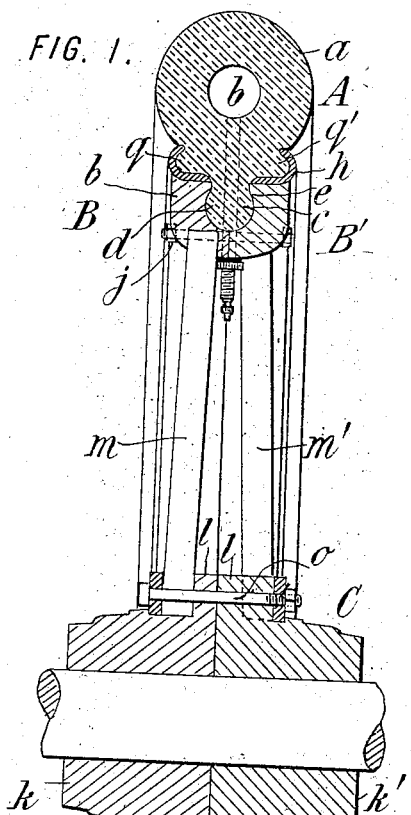
Figure 2:
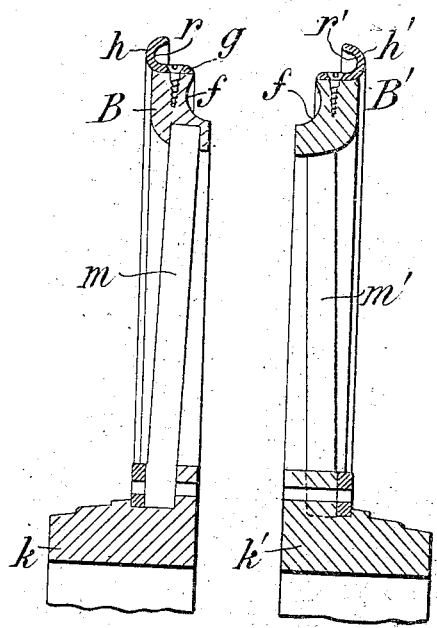
Figure 3:
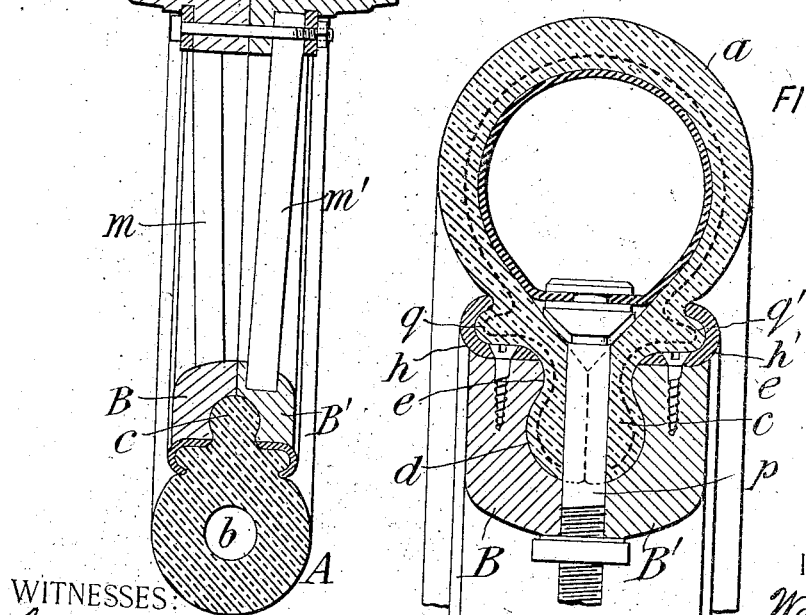

Referring to the drawings, which show one embodiment of my invention,—Figure 1 is a vertical section of a wheel and tire constructed in accordance with my invention. Fig. 2 is a view of the upper part of Fig. 1, showing the sections of the wheel separated. Fig. 3 is an enlarged section showing the application of my invention to a pneumatic tire.

Referring to the drawings, let A indicate a tire of rubber or other suitable material, which, so far as the tread portion $a$ is concerned, may be of any appropriate shape. As shown it is formed as a cushion tire having an air chamber $b$, but it may be formed of solid rubber, or may be of pneumatic or other construction, as desired. The chamber $b$ may be inflated if desired through any suitable valve, such as is shown in dotted lines in Fig. 1. The tire A is provided with a flange $c$ which extends inwardly from the inner side of the tire, and is designed to form a means of attachment of the tire to the rim. Preferably such flange is formed with an enlargement $d$ on its inner side, and a reduced portion $e$ between such enlargement and the body of the tire itself, the connecting walls being tapered as shown. The flange $c$ may be varied in shape and proportions, if desired, so long as it affords sufficient surface and strength to hold the tire to the rim, and its position with regard to the body of the tire may also be altered, but I prefer the construction shown wherein the flange is centrally arranged and is provided with an enlargement at its inner side. It will also be understood that the flange $c$ may be reinforced by canvas or other material, either in the manner indicated in dotted lines in Fig. 3 or in any other suitable way.

My invention includes a means carried by or formed as a part of the wheel rim, for clamping the flange $c$ so as to hold the tire in place. In the preferred construction shown in the drawings I form the rim in two parts B B' which are shown separated in Fig. 2. Each of the sections of the rim is formed with a groove $f$ on its inner face, such grooves forming a channel between the sections of the rim when the latter are brought together. Each section is also cut away at $g$ to provide a passage of substantially the contour of the neck $e$ of the flange. Each of the sections B B' is provided with a continuous metal rim or flange $h\ h'$ which serves to hold the parts of the rim together, and which also provide a base for the body of the tire to rest upon when the sections B B' are united. Preferably the tire is formed with side flanges $q\ q'$ which are adapted to enter channels $r\ r'$ formed in the flanges $h\ h'$. The flanges $q\ q'$ are formed so that their edges are of not greater thickness than their bases, so that they can enter the channels $r\ r'$ and their upper walls are formed so that they contact with the overhanging walls of the channels. This construction prevents any possibility of displacement of the tire by side strains. The sections B B' are preferably held together by suitable bolts $j$ spaced around the rim and passing laterally through the sections thereof. The flange $c$ of the tire and the opposing faces of the rim sections may be proportioned to obtain any desired clamping effect upon the flange $c$ and side flanges $q\ q'$. Preferably the flange $c$ is so tightly clamped between the rim sections that it is impossible for the tire to work off the rim or to creep along the latter in use. In the construction shown the clamping action is practically continuous throughout the entire circumference of the tire, so that every portion of the latter is connected to the rim.

Either or both of the rim sections B B' may constitute the rim proper of the wheel and receive the spokes of the latter, but I prefer to form the wheel in two parts, each having a hub section, and each connected to a rim section by an independent series of spokes. By this means I provide for extremely easy separation of the rim sections, so that the tire may be taken off and replaced in little time and without the aid of any special tool or tools.

As shown in the drawings I form the hub C in two parts, $k\ k'$, each of which is formed with a flange $l$, into which the spokes $m\ m'$ extend. Each hub section is provided with an independent series of spokes connecting it with its section of the rim, as best seen in Fig. 2. Suitable bolts $o$ or other devices are provided for fastening the hub sections together. Such hub sections may be formed to fit one over the other, if desired, and to be connected by screw-threads or otherwise.

In practice, when it is desired to detach the tire from the rim it is only necessary to remove the bolts $j$ and $o$ from the rim and hub sections, whereupon the outer sections of the wheel may be removed, thus practically permitting the tire to drop from the section B. The tire may be easily replaced.

When my invention is applied to a pneumatic tire a suitable valve, such as is shown at $p$, may be used, said valve being fitted into a socket formed in the rim sections and extending through the flange $c$, as shown in Fig. 3. In an inner-tube pneumatic tire such as is shown in this figure, the flange $c$ may be made in two parts, as shown, the tire being separated on its inner side to permit the introduction of the inner air tube.

Although I have described in detail one embodiment of my invention, it will be understood that I do not wish to be limited thereto, as many changes and variations may be made therein without departing from the invention. It will be understood that the flange $c$ may be placed at one side of the tire, and that the rim is formed in any suitable way or provided with any suitable means to clamp the flange. It will also be understood that the sections of the wheel may be constructed in any suitable manner to produce the desired results.

What I claim is:—

1. A wheel having a wooden rim made in two sections having opposing recesses adapted to receive the flange of a tire, and a divided metal rim, each half of which is fixed to one of the rim sections.

2. A wheel having a rim made in two sections having opposing recesses adapted to receive the flange of a tire, and a divided metal rim, each half of which is fixed to one of the rim sections and is formed with a channel adapted to receive a side flange of a tire.

3. The combination of a tire having a central flange extending inwardly from its inner side, such flange having an enlarged inner portion and a reduced outer portion or neck connecting the enlarged portion with the tire, and a wheel having a rim made in two sections and having opposing recesses adapted to receive such flange, said rim having walls conforming to the shape of said flange, and a divided metal rim, each half of which is fixed to one of the rim sections.

4. The combination of a tire having a central flange extending inwardly from its inner side, such flange having an enlarged inner portion and a reduced outer portion or neck connecting the enlarged portion with the tire, and said tire having two side flanges formed thereon, and a wheel having a rim made in two sections and having opposing recesses adapted to receive such flange, said rim having walls conforming to the shape of said flange, and a divided metal rim, each half of which is fixed to one of the rim sections and is formed with a channel adapted to receive one of said side flanges.

5. A wheel having a wooden hub formed in two sections, a wooden rim formed in two sections, and two series of spokes, each series mortised in a section of the hub and a section of the rim, and means for drawing such hub and rim sections so that the respective sections of the hub and rim are in close contact whereby the wheel is in effect an undivided wheel when the sections are joined, and a metal rim formed in two sections, each of which is fixed to a section of the wooden rim.

In witness whereof, I have hereunto signed my name in the presence of two subscribing witnesses.

WALTER BOWDEN.

Witnesses:
 EUGENE V. MYERS,
 FRED WHITE.